(12) United States Patent
Paul et al.

(10) Patent No.: US 12,056,535 B2
(45) Date of Patent: Aug. 6, 2024

(54) METHOD AND APPARATUS FOR PROVIDING NON-COMPUTE UNIT POWER CONTROL IN INTEGRATED CIRCUITS

(71) Applicant: ATI Technologies ULC, Markham (CA)

(72) Inventors: Indrani Paul, Austin, TX (US); Leonardo De Paula Rosa Piga, San Francisco, CA (US); Mahesh Subramony, Kyle, TX (US); Sonu Arora, New York, NY (US); Donald Cherepacha, Oakville (CA); Adam N C Clark, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 559 days.

(21) Appl. No.: 17/137,925

(22) Filed: Dec. 30, 2020

(65) Prior Publication Data

US 2022/0206850 A1    Jun. 30, 2022

(51) Int. Cl.
| | |
|---|---|
| *G06F 9/50* | (2006.01) |
| *G06F 1/3203* | (2019.01) |
| *G06F 1/3234* | (2019.01) |
| *G06F 1/324* | (2019.01) |
| *G06F 1/3296* | (2019.01) |
| *G06F 11/30* | (2006.01) |
| *G06F 11/34* | (2006.01) |

(52) U.S. Cl.
CPC ............ *G06F 9/505* (2013.01); *G06F 1/3203* (2013.01); *G06F 1/324* (2013.01); *G06F 1/3275* (2013.01); *G06F 1/3296* (2013.01); *G06F 9/5016* (2013.01); *G06F 11/3037* (2013.01); *G06F 11/3062* (2013.01); *G06F 11/3409* (2013.01); *G06F 2209/501* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 8,510,582 B2* | 8/2013 | Naffziger | G06F 1/324 |
| | | | 713/340 |
| 9,384,818 B2 | 7/2016 | Adelman et al. | |
| 10,338,621 B1* | 7/2019 | Tang | H02M 3/156 |
| 2012/0095607 A1* | 4/2012 | Wells | G06F 1/3203 |
| | | | 700/291 |

(Continued)

OTHER PUBLICATIONS

International Search Report and Written Opinion, PCT/IB2021/061889, Mar. 8, 2022, 11 pages.

*Primary Examiner* — Abu Zar Ghaffari

(57) ABSTRACT

Methods and apparatus employ a plurality of heterogeneous compute units and a plurality of non-compute units operatively coupled to the plurality of compute units. Power management logic (PML) determines a memory bandwidth level associated with a respective workload running on each of a plurality of heterogeneous compute units on an integrated circuit (IC), and adjusts a power level of at least one non-compute unit of a memory system on the IC from a first power level to a second power level, based on the determined memory bandwidth levels. Memory access latency is also taken into account in some examples to adjust a power level of non-compute units.

21 Claims, 11 Drawing Sheets

| MEMORY P STATE | MEMORY SPEED (MT/s) | UNCORE VOLTAGE (V) | FCLK/UCLK (MHz) | MEMCLK (MHz) | TARGET WORKLOADS |
|---|---|---|---|---|---|
| P0 | 3200 | 1.05 | 1600/1600 | 1600 | HIGH BANDWIDTH, LATENCY SENSITIVE WITH LARGE POWER HEADROOM |
| P1 | 2667 | 0.9 | 1333/1333 | 1333 | OPTIMIZED FOR MULTITHREAD CPU WORK-LOADS WITH OPTIMAL LATENCY AND POWER |
| P2 | 3200 | 0.7 | 800/800 | 1600 | HIGH BANDWIDTH, OPTIMIZED FOR PJ/BIT |
| P3 | 1600 | 0.62 | 400/400 | 400 | BATTERY LIFE WORKLOADS. OPTIMIZED FOR BEST Vmin |

700

(56) References Cited

U.S. PATENT DOCUMENTS

| | | | |
|---|---|---|---|
| 2013/0151869 A1* | 6/2013 | Steinman | G06F 1/3243 |
| | | | 713/300 |
| 2014/0089699 A1* | 3/2014 | O'Connor | G09G 5/363 |
| | | | 713/300 |
| 2014/0181539 A1* | 6/2014 | Lin | G06F 1/3275 |
| | | | 713/300 |
| 2015/0277521 A1* | 10/2015 | Jain | G06F 1/3225 |
| | | | 713/300 |
| 2017/0315747 A1* | 11/2017 | Yang | G06F 3/0634 |
| 2018/0157309 A1* | 6/2018 | Shih | G06F 13/1673 |
| 2018/0190635 A1 | 7/2018 | Choi et al. | |
| 2018/0203498 A1* | 7/2018 | Song | G06F 1/3225 |
| 2018/0267595 A1* | 9/2018 | Nampoothiri | G06F 1/3225 |
| 2020/0192454 A1* | 6/2020 | de Rochemont | G06F 1/324 |
| 2020/0379544 A1 | 12/2020 | Paul et al. | |
| 2022/0100247 A1* | 3/2022 | Garg | G06F 1/324 |
| 2022/0199142 A1* | 6/2022 | Mathiyalagan | G11C 5/147 |

\* cited by examiner

| MEMORY P STATE | MEMORY SPEED (MT/s) | UNCORE VOLTAGE (V) | FCLK/UCLK (MHz) | MEMCLK (MHz) | TARGET WORKLOADS |
|---|---|---|---|---|---|
| P0 | 3200 | 1.05 | 1600/1600 | 1600 | HIGH BANDWIDTH, LATENCY SENSITIVE WITH LARGE POWER HEADROOM |
| P1 | 2667 | 0.9 | 1333/1333 | 1333 | OPTIMIZED FOR MULTITHREAD CPU WORK-LOADS WITH OPTIMAL LATENCY AND POWER |
| P2 | 3200 | 0.7 | 800/800 | 1600 | HIGH BANDWIDTH, OPTIMIZED FOR PJ/BIT |
| P3 | 1600 | 0.62 | 400/400 | 400 | BATTERY LIFE WORKLOADS. OPTIMIZED FOR BEST Vmin |

FIG. 7

METHOD AND APPARATUS FOR PROVIDING NON-COMPUTE UNIT POWER CONTROL IN INTEGRATED CIRCUITS

BACKGROUND OF THE DISCLOSURE

Integrated circuit (IC) systems such as systems on-chips (SOCs) employ compute units, also referred to as core components, such as central processing unit cores, graphics processing unit cores, video coders and decoders (codecs), and other compute units that access memory. Such system on-chips also include non-compute units, also referred to as non-compute components that do not make memory access requests such as read and write requests, but instead perform other tasks on the integrated circuit, examples of non-compute units include data fabrics, memory controllers for memory such as dynamic random access memories (DRAM), physical interface circuits (PHY) to the DRAM memories, interconnect logic such as PCI Express interfaces, universal serial bus interconnects, and other types of non-compute units.

Some (SOC) architectures include multiple core central processing units (CPUs) and/or multiple core graphics processing units (GPUs) that are connected to the data fabric which connects to different types of memory. Such systems attempt to save power and/or improve performance by monitoring the bandwidth across sockets to other SOCs and bandwidth to the data fabric within the SOC and increase or decrease a clock frequency for the data fabric depending upon the detected bandwidth needs of the CPUs. However, when latency sensitive workloads are executing on the CPUs, latency issues can reduce performance of the system and cause increased power consumption.

With increasing data center performance needs and video content consumption growing more rapidly, power consumption of the SOCs have been difficult to reduce given the increased performance requirements. For example, power management units on the SOCs for server system on-chips, such as those used in data centers and other server products, are known to use memory bandwidth monitors, such as counters and associated logic, that attempt to identify the amount of bandwidth needed for homogeneous workloads such as those carried out by CPUs. In some systems, non-compute unit clock frequencies such as the clock frequency (FCLK) of the data fabric and other non-compute units is increased as well as associated voltage levels to voltage islands servicing the non-compute units to improve a performance state of the CPUs in the SOC when a need for more bandwidth for the CPU is detected. For example, to increase memory bandwidth, the data fabric, memory controller and physical interface (PHY) to the DRAM memories are used which is a function of memory bandwidth. However, such operation can result in an unnecessarily high power consumption by the non-compute units, adversely affecting SOC product performance. The increased power consumption of the non-compute units can significantly impact the overall total power budget that is available for a compute unit. This can reduce the performance of a compute unit under a given power budget.

The non-compute units, or non-compute units, of memory systems can include for example the data fabric, memory controllers and physical interfaces (PHY) which in combination can impact memory bandwidth. Leakage in idle power of non-compute units that are not in use, or input/output components such as multiple displays, PCI Express and USB interfaces which are not connected or used also consume power.

Different workloads on the system on-chip compute units (e.g., memory clients), put different demands on the data fabric and memory system. In cases such as high-resolution gaming, memory bandwidth can be a bottleneck for the compute engines. Other applications in many CPU workloads such as low-resolution gaming is sensitive to the latency of fetching requests from the memory. Also, legacy gaming (such as 1080p resolution games) is memory latency sensitive. Other workloads are memory bandwidth sensitive such as content creation software for video editors.

Also, current memory performance state algorithms are based on course bandwidth demand. Each performance state supports a bandwidth cut-off. If the demand is not met, the next higher appropriate state is selected by a power management unit. The higher performance state runs at a higher frequency and voltage. For example, the data fabric frequency is increased, the memory controller frequency is increased as well as the voltage of the non-compute units are all stepped up or down based on homogeneous compute unit (e.g., central processing units) bandwidth demand. This requires higher power. Bandwidth is a function of the number of parallel data buses, data bus width and the frequency of the elements used to communicate the data. Existing solutions use the frequency as a lever to provide more bandwidth, but higher frequency implies higher voltage and power costs to deliver such bandwidth.

It is desirable to have an improved power management system for integrated circuits to improve power consumption and performance.

BRIEF DESCRIPTION OF THE DRAWINGS

The implementations will be more readily understood in view of the following description when accompanied by the below figures, wherein like reference numerals represent like elements, and wherein:

FIG. 7 is a diagram illustrating a memory performance state table in accordance with one example set forth in the disclosure;

Figure 1:
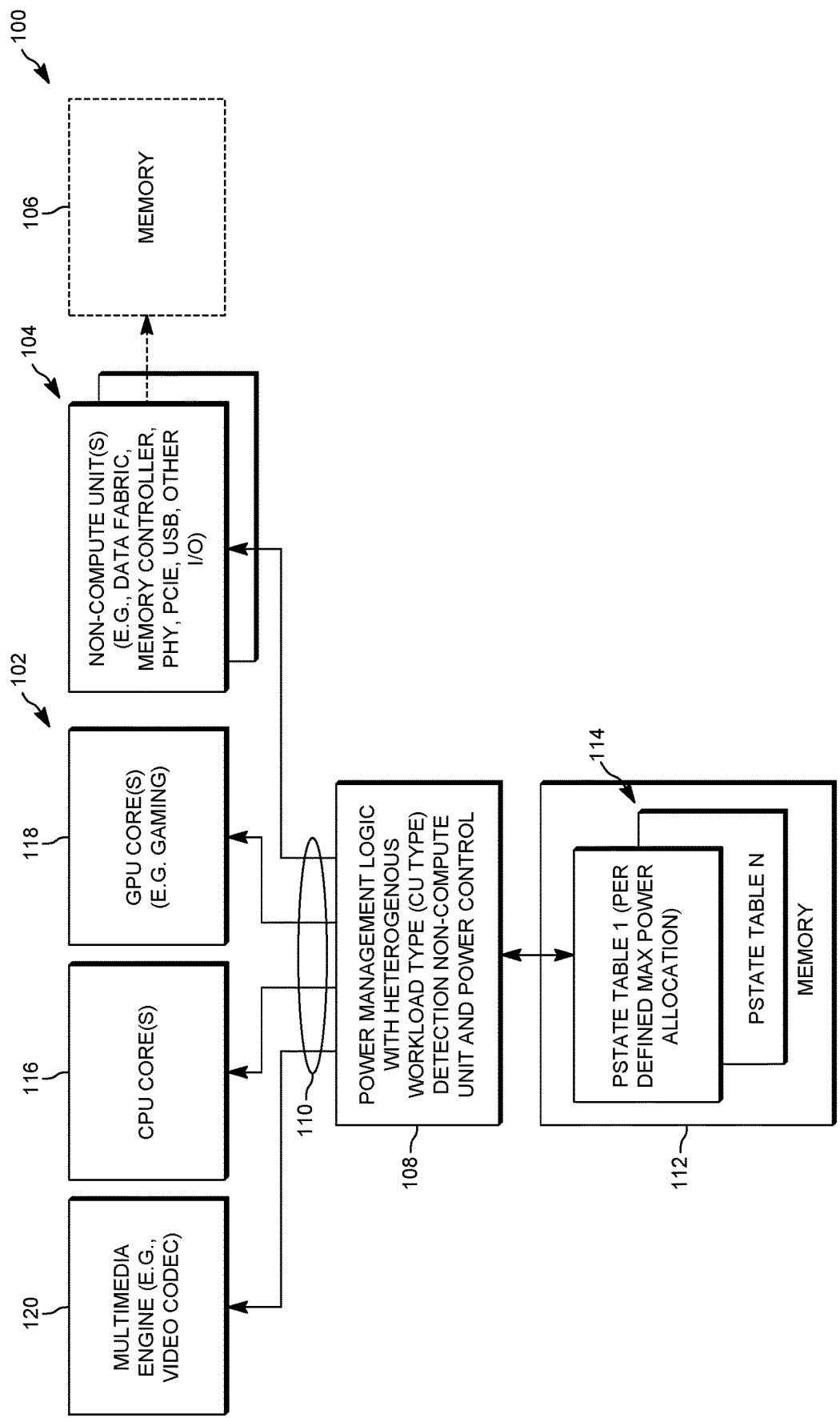
FIG. 1 is a block diagram illustrating an integrated circuit that includes power management with heterogeneous workload type detection and non-compute unit power control in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Methods and apparatus provide control of power levels to non-compute units, also referred to as non-core units, by in some implementations, controlling one or more of a data fabric clock, memory controller clock, interconnect clock, in a workload-aware manner. In some implementations, the power levels of the non-core units are grouped in a manner within memory performance states (P-states). In some examples, a runtime power management operation determines the non-compute unit operating state based on the memory bandwidth and/or memory latency characteristics of the workloads.

In some implementations, method and apparatus distinguish states and application specific requirements for latency and/or bandwidth. In some examples, only if the use case is latency sensitive is a specific data fabric frequency raised. In certain implementation, for bandwidth centric applications, the frequency is maintained at a minimum level enough to deliver maximum bandwidth through parallel interfaces such as by using a larger number of ports available by a compute unit to the data fabric than prior systems, while maintaining the frequency at a minimum level. In some implementations, method and apparatus take into account latency requirements of coherent traffic between multiple sockets in a server system to determine fabric frequency as well as within an SOC. The non-compute units often have dependencies among them such as clock frequencies and other dependencies.

In certain implementations, a method for providing power management for one or more integrated circuits (IC) includes determining a memory bandwidth level associated with a respective workload running on each of a plurality of heterogeneous compute units on the IC, and adjusting a power level of at least one non-compute unit of a memory system on the IC from a first power level to a second power level, based on the determined memory bandwidth levels.

In some examples, the memory bandwidth level includes monitoring memory access traffic associated with each of the plurality of heterogeneous compute units on the IC and wherein the at least one non-compute unit is used to access memory used by the plurality of heterogeneous compute units.

In certain examples, the non-compute unit includes a data fabric that transfers data among the heterogeneous compute units and memory, and the power level of the non-compute unit of the memory system includes selecting a memory performance state that provides a maximum level memory data transfer rate for a defined power allocation, with a reduced frequency clock of the data fabric and voltage level compared to another memory performance state that provides the same maximum level memory data transfer rate with a higher data fabric clock frequency setting and higher voltage level.

In some examples, adjusting the power level includes accessing a memory performance state table includes a plurality of memory performance states wherein each state includes data representing an allowable memory data transfer speed for the performance state, a non-compute memory system voltage setting, a data fabric clock frequency setting and a memory clock frequency setting, and wherein at least a first performance state and a second performance state include a same maximum level memory data transfer rate, the first performance state having a lower data fabric frequency setting and lower non-compute memory system voltage setting than the second performance state.

In certain implementations, an integrated circuit includes a plurality of heterogeneous compute units and a plurality of non-compute units operatively coupled to the plurality of compute units. Power management logic (PML) determines a memory bandwidth level associated with a respective workload running on each of a plurality of heterogeneous compute units on the IC, and adjusts a power level of at least one non-compute unit of a memory system on the IC from a first power level to a second power level, based on the determined memory bandwidth levels.

In some examples, the power management logic determines the memory bandwidth level by at least monitoring memory access traffic associated with each of the plurality of heterogeneous compute units on the IC, and wherein the at least one non-compute unit is used to access memory used by the plurality of heterogeneous compute units.

In certain examples, the at least one non-compute unit includes a data fabric that transfers data among the heterogeneous compute units and memory, and wherein the power management logic adjusts the power level of the non-compute unit of the memory system by at least selecting a memory performance state that provides a maximum level memory data transfer rate for a defined power allocation, with a reduced frequency clock of the data fabric and voltage level compared to another memory performance state that provides the same maximum level memory data transfer rate with a higher data fabric clock frequency setting and higher voltage level.

In some examples, the power management logic adjusts the power level by accessing a memory performance state table including a plurality of memory performance states wherein each state includes data representing an allowable memory data transfer speed for the performance state, a non-compute memory system voltage setting, a data fabric clock frequency setting and a memory clock frequency setting, and wherein at least a first performance state and a second performance state include a same maximum level memory data transfer rate, the first performance state having a lower data fabric frequency setting and lower non-compute memory system voltage setting than the second performance state.

In certain implementations, an integrated circuit includes a plurality of compute units and a plurality of non-compute units operatively coupled to the plurality of compute units. Power management logic detects memory access latency associated with a workload running on the plurality of compute units, and change a memory performance state associated with the plurality of non-compute units based on the detected memory access latency.

In some examples, the apparatus includes a data fabric configured to communicate data with at least another integrated circuit and wherein the power management logic detects memory access latency associated with a compute unit of the another IC and change the memory performance state associated with the plurality of non-compute units based on the detected memory access latency associated with the another integrated circuit.

In certain examples, the power management logic determines a memory bandwidth level associated with a respective workload running on each of a plurality of heterogeneous compute units on the IC and select a memory performance state based on both the detected memory access latency and the determined memory bandwidth levels.

In some examples, the plurality of non-computes units includes a data fabric and memory control logic, such as one or more memory controllers and associated PHY interfaces to memory. The power management logic selects the memory performance state by arbitrating among data representing a detected memory latency level associated with a central processing core compute unit and a determined memory bandwidth level associated with a graphics processing core compute unit.

In certain examples, the power management logic includes memory latency monitor logic that detects memory access latency associated with memory load requests issued by a central processing compute unit during runtime, and memory bandwidth monitoring logic that detects memory bandwidth levels associated with other of the plurality of compute units.

In some examples, the power management logic includes cross integrated circuit memory bandwidth monitor logic configured to detect memory bandwidth associated with compute units on the another integrated circuit and wherein the power management logic increases a memory performance state to a highest power state including increasing a data fabric clock frequency to a highest performance state level based on the detected memory bandwidth level from the another integrated circuit.

In certain examples, the power management logic prioritizes latency improvement for at least one compute unit over bandwidth improvement for at least another compute unit.

In some examples, the power management logic includes memory latency detection logic that detects memory latency for a workload associated with at least a first compute unit and provides a first memory performance state based on the detected memory latency. In certain implementations, the power management logic includes memory bandwidth detection logic that detects a memory bandwidth level used by at least a second compute unit and provides a second memory performance state based on the detected memory bandwidth level. In some implementations, the power management logic includes arbitration logic that selects a final memory performance state based on the first and second memory performance states and based on available power headroom data.

In certain examples, the plurality of compute units includes a plurality of heterogenous compute units and the power management logic determines a memory bandwidth level associated with a respective workload running on each of a plurality of heterogeneous compute units on the IC, and adjusts a power level of at least one non-compute unit of a memory system on the IC from a first power level to a second power level, based on the determined memory bandwidth levels.

In some examples, the power management logic determines the memory bandwidth level by at least monitoring memory access traffic associated with each of the plurality of heterogeneous compute units on the IC, and wherein the at least one non-compute unit is used to access memory used by the plurality of heterogeneous compute units.

In certain implementations, an apparatus includes a memory system, a plurality of compute units operatively coupled to the memory system and a plurality of memory non-compute units of the memory system, that includes a data fabric and memory interface logic, such as a memory controller and PHY interface to memory. The power management logic detects memory access latency associated with a workload running on at least one the plurality of compute units, determines a memory bandwidth level associated with a respective workload running on a plurality of the plurality of compute units, and changes a memory performance state associated with the plurality of non-compute units based on the detected memory access latency and the determined memory bandwidth levels.

In some examples, the power management logic changes the memory performance state by controlling an operational state of the data fabric to in response to a determination of a memory latency sensitive workload being performed by at least one of the plurality of compute units, increase a clock frequency of the data fabric to provide a maximum level memory data transfer rate for the memory, and in response to a bandwidth level increase being needed for a compute unit, selecting a memory performance state that provides a maximum level memory data transfer rate for a defined power allocation, with a reduced frequency clock of the data fabric and voltage level compared to another memory performance state that provides the same maximum level memory data transfer rate with a higher data fabric clock frequency setting and higher voltage level.

In certain examples, the power management logic includes memory latency detection logic that detects memory latency for a workload associated with at least a first compute unit and provides a first memory performance state based on the detected memory latency. In some implementations, the power management logic includes bandwidth detection logic that detects memory bandwidth level used by at least a second compute unit and provides a second memory performance state based on the detected memory bandwidth level. In some implementations, the power management logic includes arbitration logic that selects a final memory performance state based on the first and second memory performance states and based on available power headroom data. In some examples, the power management logic prioritizes latency improvement for at least one compute unit over bandwidth improvement for at least another compute unit.

In certain examples, the apparatus includes a coherent data fabric socket that interfaces with the data fabric and to compute units in both ICs. The power management logic detects memory access latency associated with a compute unit using the coherent data fabric socket and changes a memory performance state associated with the plurality of non-compute units based on the detected memory access latency associated with the other integrated circuit.

In some examples, the power management logic adjusts the power level by accessing a memory performance state table including a plurality of memory performance states wherein each state includes data representing an allowable memory data transfer speed for the performance state, a non-compute memory system voltage setting, a data fabric clock frequency setting and a memory clock frequency setting, and wherein at least a first performance state and a second performance state includes a same maximum level memory data transfer rate, the first performance state having a lower data fabric frequency setting and lower non-compute memory system voltage setting than the second performance state.

FIG. 1 illustrates an example of an integrated circuit 100 such as a system on-chip or any other suitable integrated circuit, that includes a plurality of compute units 102 that each process data and access memory, such as cache memory, shared memory such as volatile or non-volatile memory or any suitable memory. In some implementations, the compute units are accessible through a plurality of non-compute units 104. In one implementation, the non-compute units are components of a memory system that in some implementations includes memory 106 such as DRAM or any other suitable memory. The memory 106 in some implementations is integrated in the integrated circuit 100 and in other implementations is off-chip. In this example, the compute units 102 are heterogenous compute units but homogenous compute units may also be employed.

The integrated circuit 100 includes power management logic 108 that controls power settings for the plurality of heterogenous compute units and power settings for the plurality of non-compute units through suitable communication paths 110. In this implementation, the power management logic 108 includes heterogenous workload type detection and non-compute unit power control to control non-compute power consumption as further described below. In this example, memory 112, such as cache memory, register memory or any other suitable memory provides memory performance state tables 114 for the power management logic 108 to control clock frequency and voltage settings for the non-compute units 104. In some implementations the power management logic 108 generates the tables. In certain implementations the memory performance state tables 114 are stored in memory and accessible by the power management logic. If tables are used, a separate table for each defined maximum power allocation allows different types of control depending on the type of IC or device that the IC is used in such as whether a mobile device or non-mobile device. As known in the art, the memory 112 also includes, if desired, other performance state tables to control performance states of the heterogenous compute units 102 as well.

In some implementations, the integrated circuit 100 is a system on-chip wherein the heterogenous compute units each are a different type of compute unit includes central processing core 116, graphics cores 118 and one or more multimedia engines 120, such as video codecs. Such integrated circuits are employed in some examples in data center servers, laptops, desktops, game consoles, printers, smart phones, wearables, and any other suitable device. As such, the integrated circuits may, in some examples, be coupled to a battery in the case of a mobile device and in other implementations, are employed in servers, desktops, game consoles or other devices where the power source is an electrical outlet or other unlimited power source.

In this implementation and others, the power management logic 108 is implemented as a microcontroller that executes firmware, however any suitable configuration may be employed such but not limited to one or more state machines, field programmable gate arrays or other implementation. In addition, the power management logic 108 in this example, includes memory bandwidth monitors as further described below wherein a memory bandwidth monitor is configured to detect the memory bandwidth level used by each of the heterogenous compute units 102 to memory 106 or to any other suitable memory.

The power management logic 108 determines the memory bandwidth level by monitoring memory access traffic associated with each of the plurality of heterogenous compute units on the IC. In this example, a non-compute unit is used to access memory used by the plurality of heterogenous compute units and in one example, a non-compute unit includes data fabric, another non-compute unit includes a memory controller and another non-compute unit includes a physical memory interface (PHY). In some implementations, the non-compute unit includes data fabric that transfers data among the heterogenous compute units and memory 106. In some implementations, while both GPUs and CPUs can benefit from maximum bandwidth and least latency, under power constraint conditions, the power management logic makes static assumptions e.g., CPU traffic should be optimized for latency and graphics traffic for performance/watt. Multimedia unit (MM) traffic is both latency and bandwidth sensitive and on detecting MM traffic demand, the power management logic will move the uncore units to memory state P0 as also described below.

In some implementations, one of the non-compute units includes a data fabric, another non-compute unit includes a memory controller that is in communication with the data fabric, and another non-compute unit includes a physical (PHY) memory interface between memory controller and the memory 106, in some implementations the non-compute units include interconnect circuitry and input/output interconnect circuitry such as PCIE, universal serial bus and other interconnect circuits. As further described below, the data fabric transfers data among the heterogenous compute units 102 and memory 106.

Figure 2:
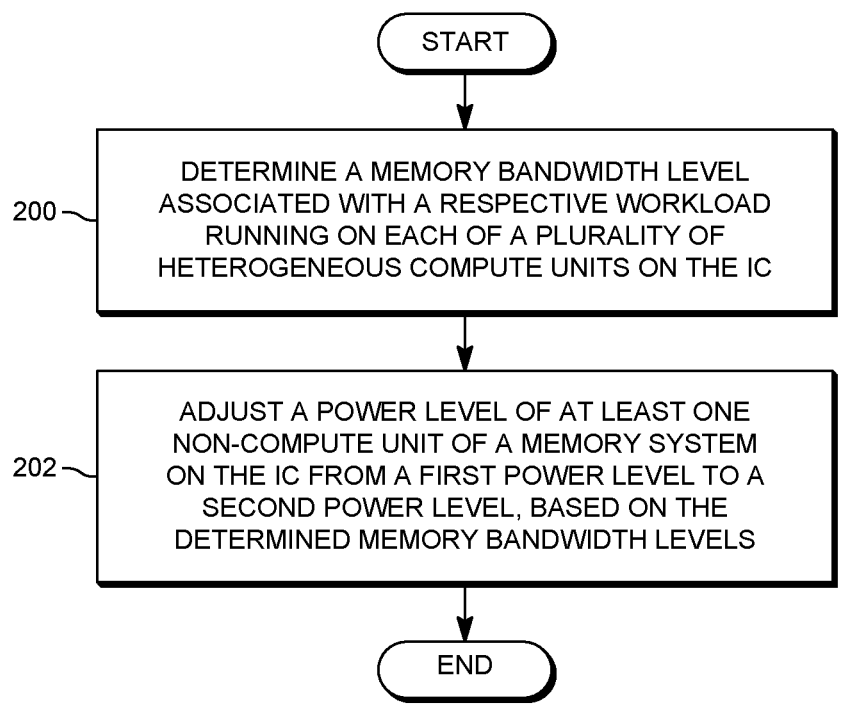
FIG. 2 is a flowchart illustrating a method for providing power management for one or more integrated circuits in accordance with one example set forth in the disclosure.

Referring also to FIG. 2, a flowchart illustrates a method for providing power management for one or more integrated circuits and in some implementations is carried out by the power management logic 108. However, it will be recognized that any other suitable logic may perform the operations and that the operations can be performed in any suitable order. As shown in block 200, the method includes determining a memory bandwidth level associated with a respective workload running on each of the plurality of heterogenous compute units 102. As shown by block 202, the method includes adjusting a power level of at least one of the non-compute units 104 of a memory system, from a first power level to a second power level, based on the determined memory bandwidth levels associated with respective workloads running on each of the plurality of heterogenous compute units 102.

Stated another way, the integrated circuit 100 includes a plurality of heterogenous compute units 102, a plurality of memory system non-compute units 104 and power management logic 108 that determines which of a plurality of heterogeneous types of workloads is being performed by one or more of the heterogenous compute units on the IC. This is done by using a bandwidth detector, as further described below, for each compute unit and evaluating bandwidth usage of each compute unit. The power management logic 108 adjusts an operating state of at least one memory system non-compute unit, such as a data fabric, that provides an increased power allocation for the determined type of heterogeneous workload. For example, non-compute unit power is decreased so that more power is available to apply for the compute unit power. For example, the voltage and/or operating frequency of the compute is increased by the power management logic 108 using known techniques, such as through using PState tables for the compute units.

Figure 3:
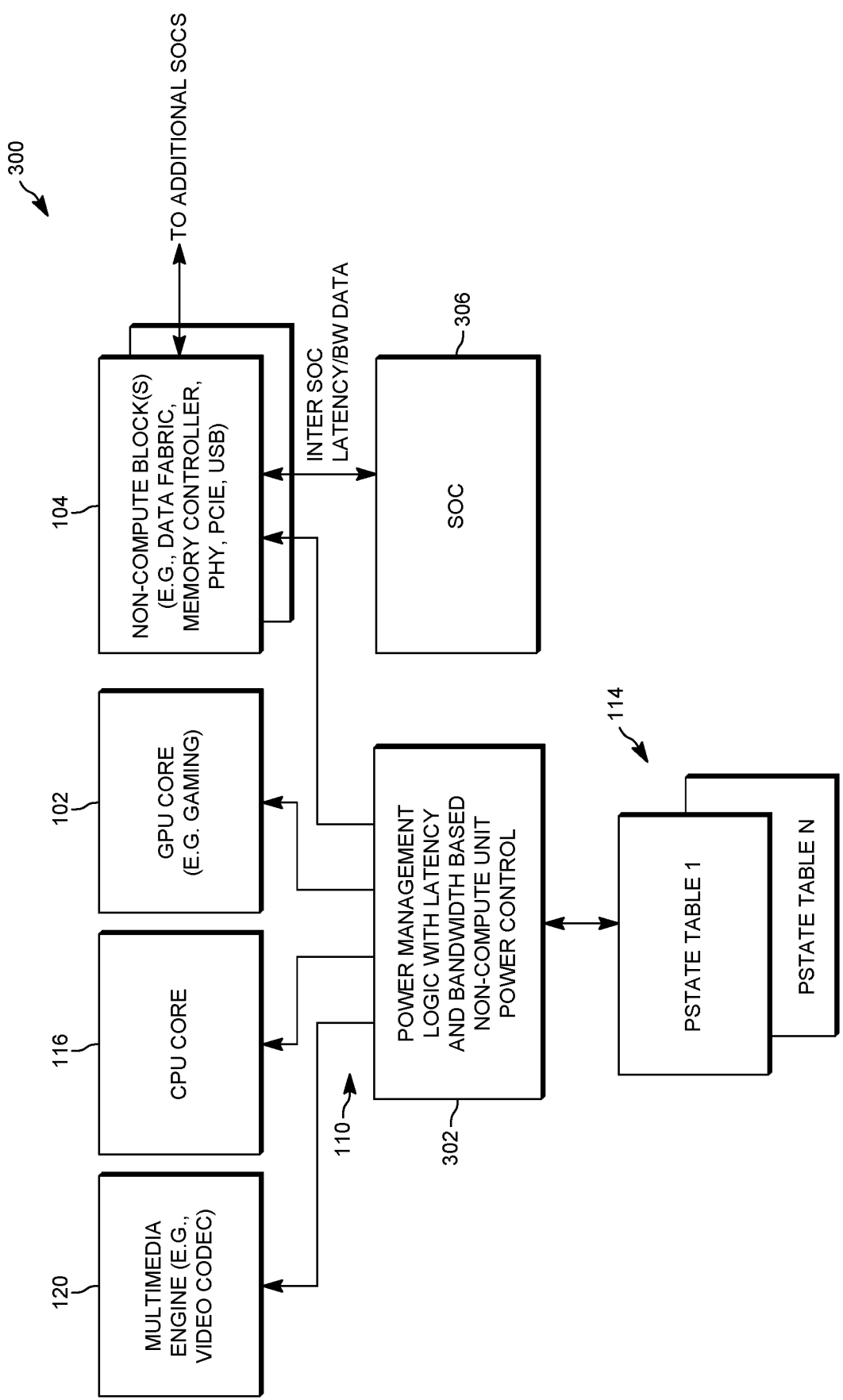
FIG. 3 is a block diagram illustrating an integrated circuit that provides power management with latency and bandwidth based non-compute unit power control in accordance with one example set forth in the disclosure.

FIG. 3 is a block diagram illustrating another example of an integrated circuit 300 that employs power management logic 302 that monitors memory latency associated with a compute unit such as CPU core 116 in addition to bandwidth monitoring based non-compute unit power control similar to that shown in FIG. 1. In some implementations, the power management logic 302 provides memory latency monitoring for one or more of the compute units without providing bandwidth monitoring. For purposes of discussion, the power management logic 302 in this example employs both memory latency monitoring and bandwidth monitoring to control non-compute unit power levels. It will be recognized that the compute units 102 in some implementations are all the same type (i.e., homogeneous) such as all CPU cores or CPU complexes on-chip and as such, are not heterogenous. However, in this example, the compute units 102 are shown to be heterogenous compute units. Heterogenous compute units are units that are of different types whereas homogenous are all of the same type, meaning for example all CPUs, all GPUs, or all multimedia units, for example.

The power management logic 302 in this example is similar to the power management logic 108 but also includes memory latency detection so that both memory latency and memory bandwidth monitoring is used to determine a suitable power level for non-compute blocks. In addition, this implementation illustrates the use of an inter-integrated circuit socket used to interconnect another integrated circuit 306 such as another SOC. The socket interconnects with, for example, the data fabric. The performance state tables 114 include memory performance state settings for the non-compute units for differing defined maximum power levels allocated for a given mode of operation. For example, a memory PState table in one example is for a laptop configuration maxed out at, for example, 15 watts whereas another memory PState table is for a desktop or server implementation allowing a 45 watt power allocation, however any suitable power allocations may be employed in any suitable number of performance state tables.

Figure 4:
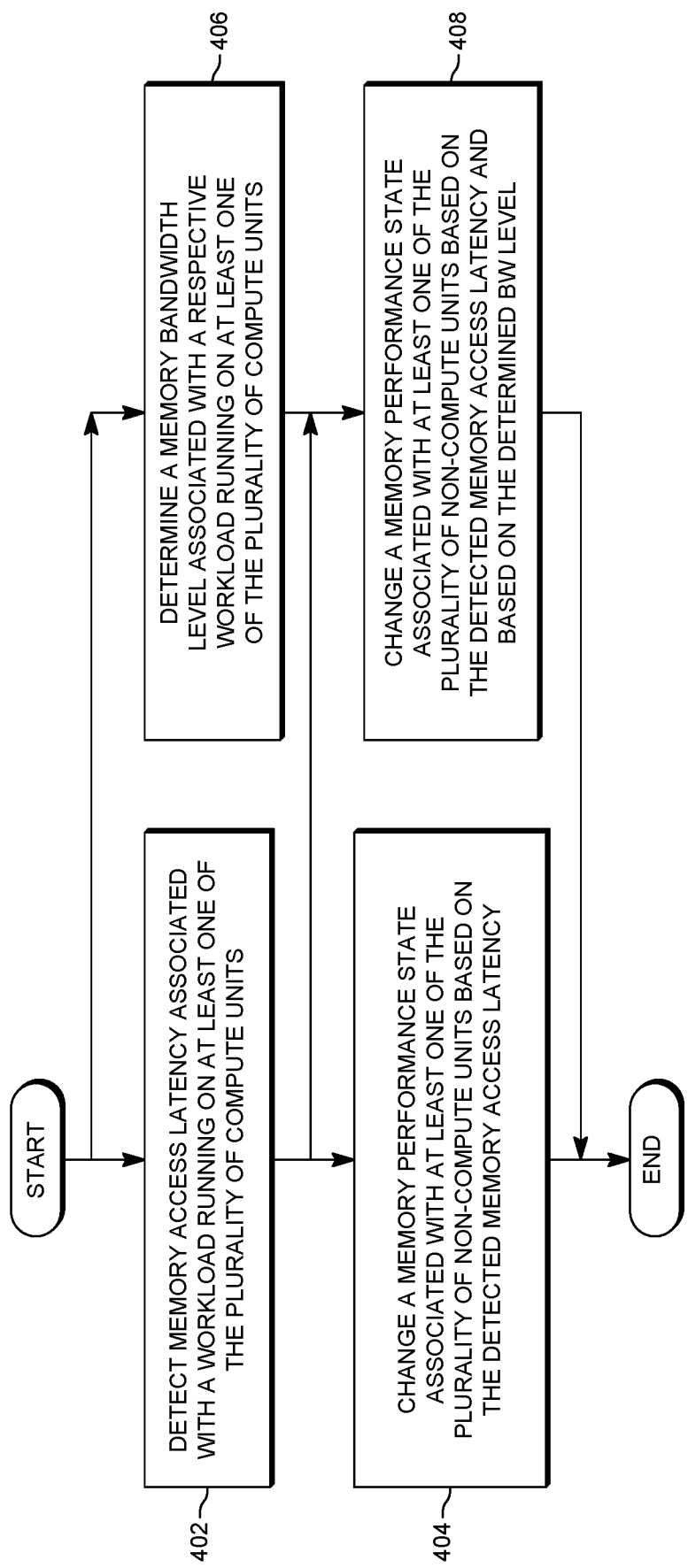
FIG. 4 is a flowchart illustrating a method for providing power management for one or more integrated circuits in accordance with one or more examples set forth below.

Referring to FIG. 4, a method for providing power management for one or more integrated circuits is shown. It will be recognized that the operations can be made in any suitable order and carried out by any suitable structure. In certain implementations, the method is carried out by the power management logic 302. In one implementation, the power management logic 302 is configured to only carry out memory access latency detection for homogenous units such as the CPU cores 116. In other implementations, the power management logic 302 performs both memory latency detection and memory bandwidth level detection for the compute units.

In some implementations, the method includes, as shown in block 402, detecting memory access latency associated with a workload running on at least one of the plurality of compute units. For example, the workload running on the CPU core is monitored through the use of a memory latency detector that evaluates memory latency experienced by the CPU core 116. As shown in block 404, the method includes changing a memory performance state associated with the non-compute unit, such as the CPU, based on the detected memory access latency. For example, if latency errors are detected for the CPU, the power management logic increases the memory power state to its lowest level (highest power state) so the CPU does not experience latency disruptions while executing the workload. As such, latency workloads are given a priority over bandwidth intensive workloads.

In certain implementations, the method also takes into account memory bandwidth levels that are detected for the same or other compute units and attempts to provide the best memory performance state for a given scenario. As shown in block 406, the method includes determining a memory bandwidth level associated with a respective workload running on at least one of the plurality of compute units which in this example includes a GPU core, a multimedia engine, as well as a CPU core. As shown in block 408, the power management logic takes into account both the detected memory access latency from block 402 as well as the determined memory bandwidth levels associated with the various compute units and changes in memory performance state based on the detected memory access latency and based on the determined bandwidth level from block 406. For example, for in-socket or on-chip local latency sensitive threads, the power management logic 302 prioritizes latency optimization over bandwidth optimization. However, if the bandwidth requirements of the multiple compute units exceed a certain level, and the bandwidth usage becomes a bottleneck, the power management logic overrides a latency optimization setting. Also, latency sensitivity across sockets between multiple integrated circuits is also addressed such as latency for coherent data transfer between sockets. For example, workloads like transaction databases, which require large memory footprints in data centers and are not completely localized to each socket can be sensitive to latency problems. In such situations, the power management logic raises the fabric frequency and voltage, when for example the memory bandwidth cannot go any higher.

Figure 5:
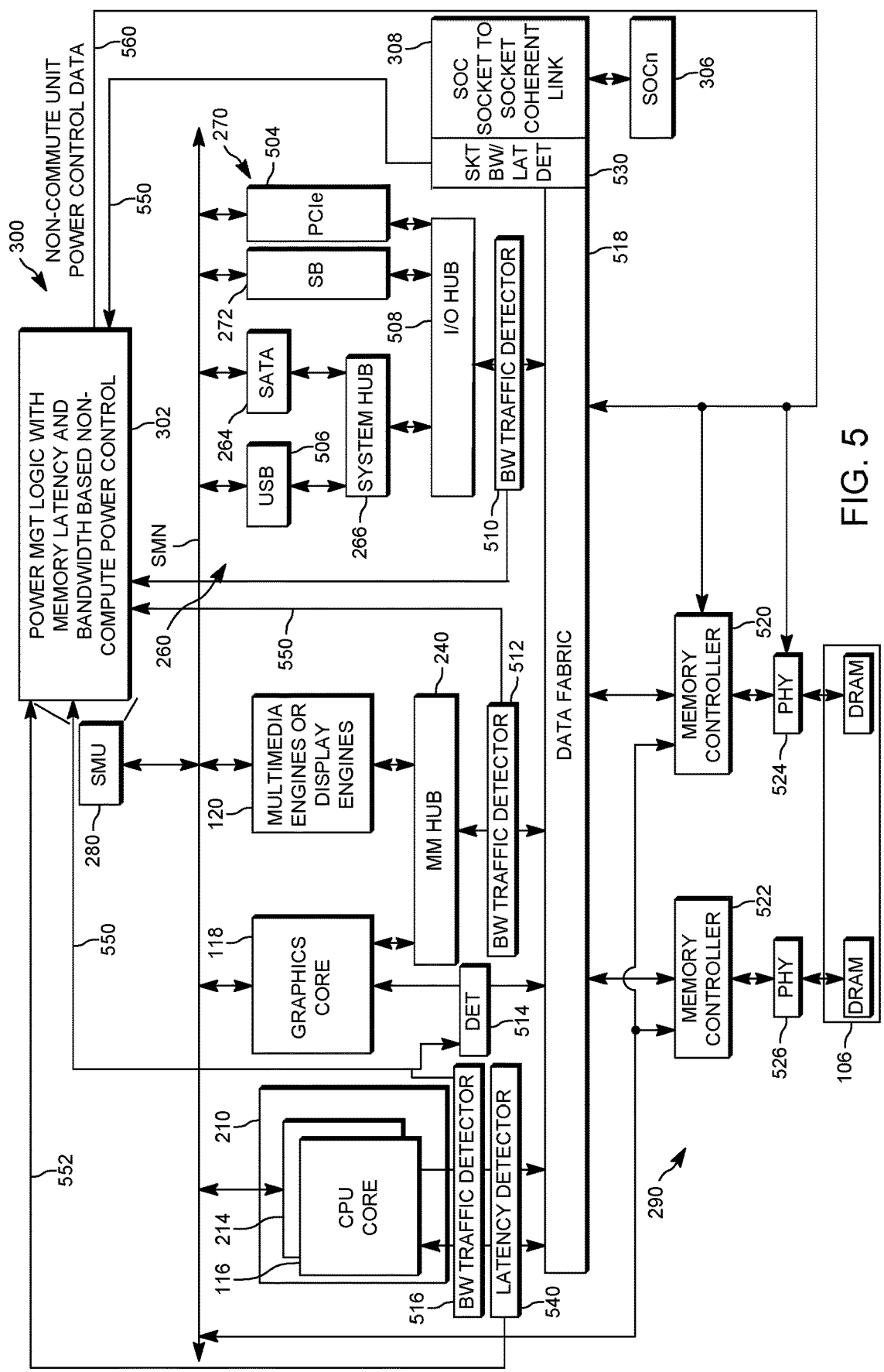
FIG. 5 is a block diagram illustrating an apparatus that includes power management control with memory latency-based non-compute unit power control in accordance with one example set forth in the disclosure.

FIG. 5 illustrates in block diagram of an integrated circuit (IC) 300, such as an APU suitable for use in data processing system. However, the IC 300 may be any suitable IC including for example, an SOC for use in a desktop computer, game console, mobile device such as a laptop, tablet, wearable, or other suitable device. In this example, the IC 300 includes generally a central processing unit (CPU) core complex 210, a graphics core 118, a set of display engines or multimedia engines 120, a memory management hub 240, a data fabric 518, a set of peripheral controllers 260, a set of peripheral bus controllers 270, a system management unit (SMU) 280, and a set of memory controllers 290 (memory controller 522 and memory controller 520).

CPU core complex 210 includes a CPU cores 116. In this example, CPU core complex 210 includes two CPU cores, but in other embodiments CPU core complex can include an arbitrary number of CPU cores. Each of CPU cores 116 and 214 is bidirectionally connected to a system management network (SMN), which forms a control fabric, and to data fabric 518, and is capable of providing memory access requests to data fabric 518. Each of CPU cores 116 and 214 may be unitary cores, or may further be a core complex with two or more unitary cores sharing certain resources such as caches.

Graphics core 118 is a high-performance graphics processing unit (GPU) capable of performing graphics operations such as vertex processing, fragment processing, shading, texture blending, and the like in a highly integrated and parallel fashion. Graphics core 118 is bidirectionally connected to the SMN and to data fabric 518, and is capable of providing memory access requests to data fabric 518. In this regard, APU may either support a unified memory architecture in which CPU core complex 210 and graphics core 118 share the same memory space, or a memory architecture in which CPU core complex 210 and graphics core 118 share a portion of the memory space, while graphics core 118 also uses a private graphics memory not accessible by CPU core complex 210.

Multimedia engines 120 or display engines render and rasterize objects generated by graphics core 118 for display on a monitor. Graphics core 118 and display engines are bidirectionally connected to a common memory management hub 240 for uniform translation into appropriate addresses in memory system, and memory management hub 240 is bidirectionally connected to data fabric 518 for generating such memory accesses and receiving read data returned from the memory system.

Data fabric 518 includes a crossbar switch for routing memory access requests and memory responses between any memory accessing agent and memory controllers 290 (memory controller 522 and memory controller 520). It also includes a system memory map, defined by BIOS, for determining destinations of memory accesses based on the system configuration, as well as buffers for each virtual connection.

Peripheral controllers 260 include a USB controller 506 and a SATA interface controller 264, each of which is bidirectionally connected to a system hub 266 and to the SMN bus. These two controllers are merely exemplary of peripheral controllers that may be used in APU.

Peripheral bus controllers 270 include a system controller or "Southbridge" (SB) 272 and a PCIe controller 504, each of which is bidirectionally connected to an input/output (I/O) hub 508 and to the SMN bus. I/O hub 508 is also bidirectionally connected to system hub 266 and to data fabric 518. Thus, for example a CPU core can program registers in USB controller 506, SATA interface controller 264, SB 272, or PCIe controller 504 through accesses that data fabric 518 routes through I/O hub 508.

SMU 280 is a local controller that controls the operation of the resources on APU and synchronizes communication among them. SMU 280 manages power-up sequencing of the various processors on APU and controls multiple off-chip devices via reset, enable and other signals. SMU 280 includes one or more clock sources not shown in FIG. 2, such as a phase locked loop (PLL), to provide clock signals for each of the components of APU. SMU 280 also manages power for the various processors and other functional blocks, and may receive measured power consumption values from CPU cores 116 and 214 and graphics core 118 to determine appropriate power states.

APU also implements various system monitoring and power saving functions. In particular one system monitoring function is thermal monitoring. For example, if APU becomes hot, then SMU 280 can reduce the frequency and voltage of CPU cores 116 and 214 and/or graphics core 118. If APU becomes too hot, then it can be shut down entirely. Thermal events can also be received from external sensors by SMU 280 via the SMN bus, and SMU 280 can reduce the clock frequency and/or power supply voltage in response.

FIG. 5 also illustrates a plurality of integrated circuits 300 and 306 that are interconnected through a socket 308 such as a socket connecting a coherent data fabric between the SOCs. Such an implementation may be employed in server systems and data centers and any other devices that employ multiple SOCs. As such in this example the IC includes a coherent data fabric socket coupled to the data fabric and to some of the plurality of compute units and the power management logic 302 detects memory access latency and/or bandwidth associated with a compute unit from another IC using the coherent data fabric socket and changes a memory performance state associated with the plurality of non-compute units based on the detected memory access latency associated with the another integrated circuit. This is done in one example by increasing the clock frequency and operating voltage of the data fabric to improve bandwidth through the data fabric when more bandwidth is needed for compute units in the SOC or on the SOC in the other socket.

As also shown in this example, the integrated circuit 300 includes a number of different non-compute units such as the interconnects PCIe controller 504, 506 through an input/output hub 508. A bandwidth detector 510 is configured to detect a memory bandwidth level passed by the I/O hub to the data fabric for clients using the USB and PCI Express interconnects, for example, to access memory 106. Independent bandwidth detectors 512, 514 and 516 are configured to detect memory bandwidth levels by monitoring memory access traffic associated with the heterogenous compute units in this example, display engine, graphics core and CPU core through differing data ports to the data fabric 518. The data fabric 518 transfers data among the heterogenous compute units in this example, 120, 116 and 118 as well as for interconnect non-compute units 506, 504. The power management logic (also referred to as a power management controller) 302 determines memory bandwidth levels for each of the compute units by monitoring memory access traffic associated with each of the compute units. A type of workload is inferred from the type of compute unit accessing memory 106 through the data fabric 518. For example, a high bandwidth level detected by bandwidth detector 514 that is monitoring the memory bandwidth usage of the graphics core will be used to determined that a gaming application is being executed as a workload by the graphics core. Similarly, the bandwidth detector 516 configured to monitor the bandwidth level used by the CPU core can be inferred to be a CPU intensive workload. The data fabric 518 provides data flow to respective memory controllers 520 and 522 which together with the physical interfaces 524 and 526 respectively, form a memory system. The memory system in some implementations also includes the memory 106. As such, in some implementations, non-compute units 518-526 are used to access memory 106 are used by the compute units to access the memory.

In this implementation, the data fabric 518 is configured to communicate data with at least another integrated circuit 306 through the socket 308. The power management logic 302 detects memory access latency through socket latency detector and/or bandwidth through socket bandwidth detector 530. Socket bandwidth detector 530 in one implementation is a lane width detector that detects the number of lanes being used by the SOC 306. The more lanes being used, the larger bandwidth usage by the SOC 306 that is detected. In some implementations the socket bandwidth detector 530 includes a socket to socket latency detection mechanism. Latency for another SOC can be inferred based on workload type such as if a CPU from the other SOC is requesting memory or latency can be calculated using latency counters from each SOC as further described below. As such, the power management logic detects memory access latency associated with the compute unit of the other ICs 306 and changes the memory performance state associated with the non-compute unit such as data fabric 518, memory controllers and non-compute units 520-526 to change the memory performance state associated with the non-compute units based on the detected memory access latency associated with the SOC 306.

The power management logic 302 determines a memory bandwidth level associated with a respective workload running on each of the compute units 120-118 and selects a memory performance state based on both detected memory access latency and determined memory bandwidth. A latency detector 540, also referred as to memory latency detection logic, is configured to measure memory access latency for the CPU in connection with memory access to memory 106, such as DRAM. Each of the bandwidth detectors and latency detectors employ a programmable threshold that is stored in, for example, configuration registers to set the threshold that indicates an undesirable amount of latency or an undesirable amount of bandwidth usage by a particular compute unit. The power management logic 302 includes the latency detector 540 that detects memory access latency associated with memory load requests issued by the central processing compute core 116 (compute unit) during runtime. The power management logic 302 also includes the bandwidth detectors 516, 514, 512 and 510 that detect memory bandwidth levels associated with each of the respective compute units. It will be recognized that the location of the bandwidth detectors can be at any suitable location within the integrated circuit such as, for example, as part of data ports to the data fabric to detect incoming and outgoing data associated with memory access requests (e.g., read and write) to the memory 106 or at any other suitable interface as desired. Bandwidth detector 512 detects die to die bandwidth through data ports of the data fabric. Bandwidth detector 510 detects bandwidth from I/O devices such as PCIe connected devices.

In some implementations, the socket bandwidth detector 530 serves as cross integrated circuit memory bandwidth monitor logic that detects memory bandwidth associated with compute units in the integrated circuit 306. The power management logic 302 increases a memory performance state to a highest power state including increasing a data fabric clock frequency to a highest performance state level based on a detected memory bandwidth level from the other integrated circuit. For example, if the socket bandwidth detector 530 detects a bandwidth usage level beyond a threshold, the power management logic 302 increases the data fabric clock frequency and non-compute unit voltage as well as the clock frequencies if desired for other non-compute units such as the memory controller from a previous performance state level to increase the amount of bandwidth that the data fabric and memory system can process.

The power management logic 302 prioritizes latency improvement for the compute unit, such as the CPU core 116 over bandwidth improvement for another compute unit, such as the graphics core 118. For example, when an undesirable amount of latency is detected for the CPU, a higher level of power (a lower power state such as from P1 to P0) is implemented by the power management logic 302.

Each of the bandwidth detectors provides bandwidth metrics such as bandwidth level data 550 to the power management logic 302. Similarly, the latency detector 540 provides measured information in the form of metrics such as count data indicating the number of late loads that were encountered shown as latency count data 552. In some implementations the SOC 306 has a similar latency and bandwidth detector arrangement as SOC 304 such that the socket bandwidth detector 530 block represents a latency detector in SOC 306 providing measured latency information from the SOC 306 for the PML, so that latency information from SOC 306 can be compared to latency information from latency detector 540 as further described below. The power management logic 302 provides also operational state power control data 560 to the non-compute units to, for example, control a clock frequency and voltage level used by each of the non-compute units. The power control data settings in one implementation are stored in a performance state table 114.

Generally, the power management logic, for computationally intensive workloads, pushes the non-compute unit memory P-state to the lowest level (P0) to allow more power allocation to the compute resources. For bandwidth optimization, which is heavily influenced by the memory controller frequency (UCLK), the power management logic moves to the highest memory frequency state. By way of example, major bandwidth paths that can trigger memory P-state changes are DRAM read and write traffic, interconnects bandwidth usage (e.g., die to die communications links on a socket, link and socket to socket links) and Input/Output PCIe traffic.

For in-socket local latency sensitive threads, the power management logic prioritizes latency optimization over BW optimization. However, if the BW requirements exceed a certain level, then BW becomes the bottleneck, so the power management logic overrides any latency optimization decisions. Additionally, workloads like transaction databases which require large memory footprint and hence are not completely localized to each socket may be sensitive to latencies for coherent data transfer between sockets. The power management logic detects such cases by checking latency demand across sockets and raises the fabric frequency even when DRAM bandwidth cannot go any higher (e.g., constrained by a maximum speed of the memory device that is connected).

For power optimization, this is divided in two phases: power optimization when in active state and power optimization when in idle state. For power optimization in an active state, Power during activity (pj/bit) is prioritized such as graphics gaming workloads that have high bandwidth and an optimal pj/bit requirement especially in power constrained 15 W notebook applications. Therefor PState P2 is used to reduce non-compute unit power consumption and allows the compute unit, such as the GPU to have an increased clock frequency and hence higher power allocation. The PML sets the GPU clock to a higher speed using a compute unit PState table as known in the art. For power consumption during idle conditions (low BW) which is important for battery life workloads, the PML selects the non-compute units to operate at lowest PState (P3) with the lowest non-compute voltage setting (Vmin).

Figure 6:
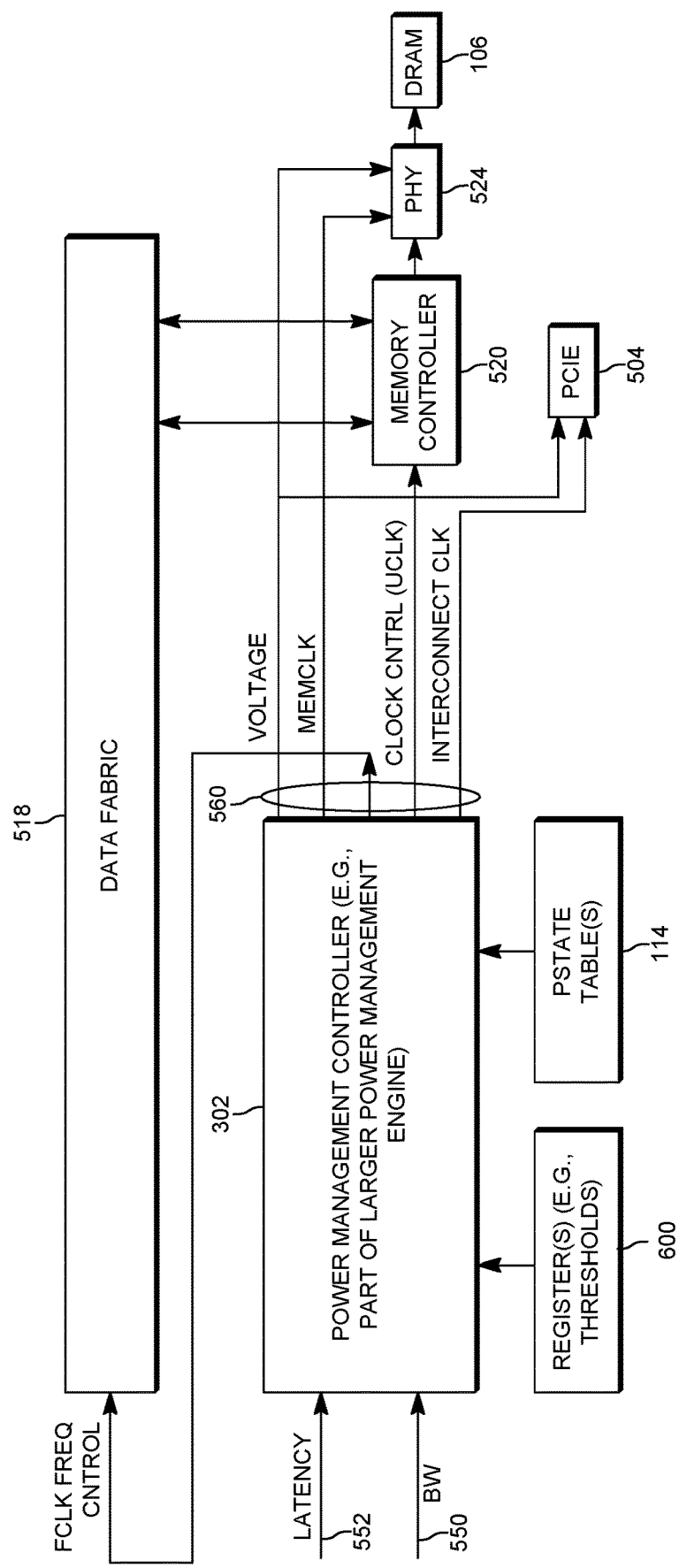
FIG. 6 is a block diagram illustrating an apparatus employing non-compute unit power management in accordance with one example set forth in the disclosure.

Referring also to FIGS. 6-7, the use of memory performance state data such as memory performance state tables will be described. It will be recognized that any suitable data structure may be employed. FIG. 6 is a block diagram illustrating one example of a portion of the integrated circuit 300 and illustrates that the power management logic 302 controls one or more clock frequencies and voltages for the non-compute units. In this example, FCLK is clock for the data fabric 518, MEMCLK is the clock for the physical interface (PHY) 524 to the memory and UCLK is the clock for the memory controller 520. An interconnect non-compute block, such as the I/O Hub or PCIE blocks use an interconnect clock. A voltage level is shared among the memory non-compute units in this example and is varied along with clock frequency depending on a memory performance state selected by the power management logic (PML). Registers 600 store programmable thresholds used by the PML to compare to predicted or actual latency metrics and bandwidth metrics obtained by the latency detector 540 and bandwidth detectors 510-516.

Referring to FIG. 7, a memory performance state (PState) table 700 shows four power levels referred to as PStates P0-P03 for operational settings for non-compute units, with P0 being the highest performance state and P3 being the lowest performance state. The power management logic 302 adjusts the power level by accessing the memory performance state table 700. The memory performance state table 700 includes a plurality of memory performance states (P0-P3) wherein each state includes data representing an allowable memory data transfer speed for the performance state (e.g., 3200 MT/sec, 1600 MT/sec), a non-compute memory system voltage setting (e.g., uncore voltage used for data fabric, memory controller and PHY), a data fabric clock frequency setting (FCLK) a memory clock frequency setting (MEMCLK) and a memory controller (UCLK) setting. A performance state P2 an P0 have a same maximum level memory data transfer rate (e.g., 3200 MT/sec), and state P2 has a lower data fabric frequency setting and lower non-compute memory system voltage setting than the P0 state to leaves more power budget available for the compute units. For example, lowering the power level for the non-compute units allows the PML to apply better performance options for the compute unit such as by allowing the compute unit to operate with a higher frequency/voltage than otherwise available without the instant non-compute unit power control.

In this example the non-compute units are part of the memory system and include the data fabric, memory controller and PHY interfaces. PState P0 is for workload types that require a high bandwidth and low latency, such as CPU workloads and multimedia playback workloads such as high definition and standard definition video/audio playback by video codecs, including live video playback. PState P1 is used for power constrained workloads and optimized to provide an optimal level of bandwidth and latency for workloads while using a lower power level than P0. Such workload types include multithread CPU workloads. PState P2 is a lower non-compute unit power level setting that provides high bandwidth and is optimized for picojoule per bit (pj/bit) operation. Such workload types include graphics gaming workloads. PState P3 is a battery power savings level and is optimized to provide low power operation.

As seen, all PStates use the same frequency for all non-compute units except for PState P2 which halves the data fabric frequency compared to the MEMCLK and has a lower voltage than P0 and P1. The memory transfer rate of 3200 MT/s is the same for P2 as for P0. The data fabric uses a wider data port for the compute units to allow them to use a higher bandwidth with a lower data fabric clock. For example, the data paths to the data fabric are wider for engines that need wider data paths to optimize power, BW and latency of certain compute units. For example, the GPU 118 to memory interface is two times that of some other compute units so that the data fabric is run at half speed to save power at the cost of latency. GPU engines can tolerate more latency than other engines such as a CPU. However, if there is a loss in performance (GPU performance is higher with a higher FCLK) that is more than overcome by the significantly reduced non-compute power, resulting in higher GPU clocks when power is limited. P03 is used for saving battery life and used for battery life workloads.

The power management logic 302, as shown by PState P0, changes the memory performance state by controlling an operational state of the data fabric to, in response to a determination of a memory latency sensitive workload being performed by at least one of the plurality of compute units, increase a clock frequency (FCLK) of the data fabric to provide a maximum level memory data transfer rate (e.g., 3200 MT/sec) for the memory 106. In response to a bandwidth level increase being needed for a compute unit, the PML 302 selects a memory performance state (P2) that provides a maximum level memory data transfer rate (e.g., 3200 MT/sec) for a defined power allocation, such as for a 15 W power state table for a battery based device or a 40 W defined power allocation for a non-battery powered device, with a reduced frequency clock of the data fabric (e.g., 800 MHz for P2 vs 1600 MHz for P0) and voltage level (0.7 V for P2 vs 1.05 V for P0) compared to another memory performance state (P0) that provides the same maximum level memory data transfer rate with a higher data fabric clock frequency setting and higher voltage level.

Figure 8:
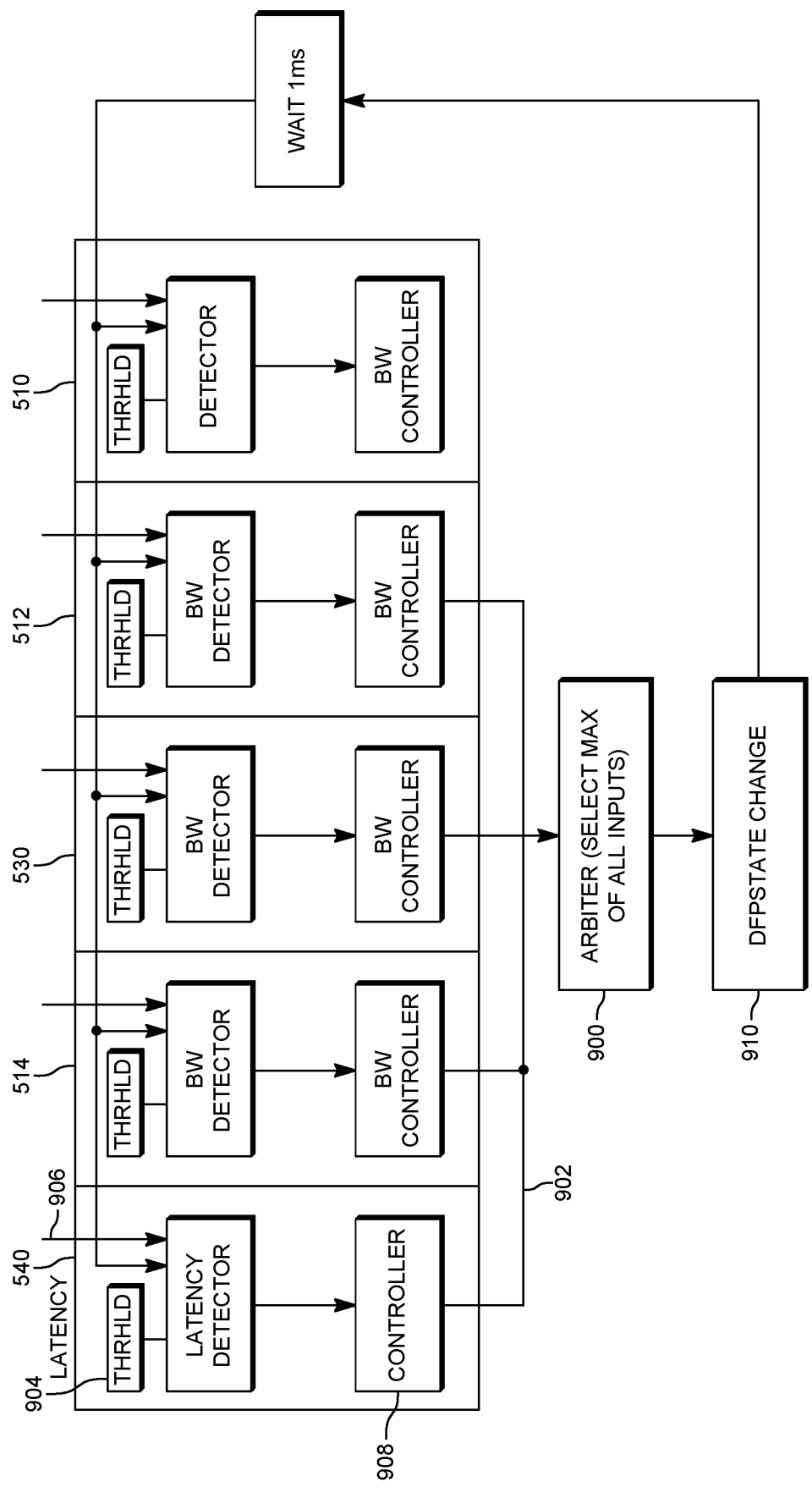
FIG. 8 is a block diagram illustrating power management logic in accordance with one example set forth in the disclosure.

FIG. 8 is a block diagram illustrating an example of the power management logic employing the latency detector and bandwidth detectors and arbiter 900, also referred to as arbitration logic, that selects a final memory performance state based on memory performance states provided by each of the bandwidth detectors 510-514, 530 and 540 and based on available power headroom data, such as generated by the PM. For example, conventional head room calculations are performed such as based on SOC thermal design power (PDP) and information from power monitor across the SOC to calculate the current power expenditure to determine available power headroom. The PML produces non-compute unit power increases if bandwidth is needed or increases data fabric frequency if a latency sensitive workload is detected. The memory latency detection logic, shown as latency detector 540 in this example, detects memory latency for workloads associated with a particular compute unit, such as a CPU core, depending upon where the request originates including within an SOC or across SOCS, and provides a memory performance state 902 based on the detected memory latency. Similarly, memory bandwidth detection logic shown as bandwidth detectors 510, 512, 514 and 530 each provide a determined memory performance state based on a detected memory bandwidth level from each respective compute unit (including compute unit demand from across sockets).

For example, each of the latency detector and bandwidth detectors serve as an independent optimization unit that measures actual latency data or data traffic metrics and/or predicted latency and/or predicted bandwidth usage, and looks for its own performance state. In some implementations where actual runtime data is monitored, the detectors compare monitored metrics 906 to one or more thresholds generally shown as 904 and choose a non-compute unit memory performance state. A controller 908 selects one of the four memory PStates to output as memory performance state 902 to the arbiter 900. The arbiter 900 then selects the maximum state of all received PStates. Maximum refers to the highest power output provided by the non-compute units. For example, if the latency detector 540 detects a high amount of latency being experienced because the latency delays are beyond a threshold 904, the controller 908 will select the maximum PState P0 to be output to the DPM arbiter which because this is the highest state, will cause a non-compute unit memory state change as shown by 910 if the memory performance state is not already at P0. The independent units monitor memory bandwidth, memory latency and socket-to-socket communication.

In some implementations, socket-to-socket communication is measured by bandwidth detector 530, for example, between sockets. For example, to optimize remote latency between two sockets, the bandwidth detector 530 monitors the bandwidth between sockets and selects a non-compute unit performance state that will raise the data fabric frequency based on a socket-to-socket activity. For example, if the link goes to x16, the power level is raised by going to the highest PState (P0). As such, remote latency optimization is prioritized over pure bandwidth optimization. For example, bandwidth detector 514 associated with the graphics core, may detect a high bandwidth condition and selects PState P2 which is a lower state than P0 which would be output by the inter-integrated circuit bandwidth detector 530 giving socket-to-socket activity priority.

Referring still to FIG. 8, the detectors operate individually and select the state considering the metric used by each detector. The arbiter 900 makes the final decision based on the activity monitors and force a P-state change in every decision interval when the PState is different from a currently set PState.

In some implementations the non-compute PState operation can be disabled. For example, based on max DDR speed supported in the platform (e.g., through a user setting or DRAM capability) and a fused maximum FCLK frequency setting for the IC, the power management logic selects and train four memory system non-compute unit P-states for run-time power management. Two of the states (P2 and P1) being used for run-time active power management, another state that is fixed when the run-time latency/bandwidth detection operation is disabled and a state for idle power management or an efficiency mode (for performance optimizations).

As noted above, the PML chooses the non-compute unit PState based on bandwidth and/or latency monitoring of workloads by the compute units. The PML controls to default to a lowest PState (e.g., P2) when active and push to higher up non-compute engine PStates (e.g., P1, P0) based on detected (which includes predicted) workload characteristics.

In certain scenarios where low latency is desirable, a higher compute clock (CCLK) for a compute unit, that is controlled by the PML, may still provide better performance. In some implementations the PML prevents the PState change mechanism from aggressively switching to higher P-states to lower the latency, taking power away from the Cores and lowering CCLK, adversely affecting performance. In some implementation a user sets a CCLK threshold in a register through a user interface, that the PML uses as a gate to prevent aggressively switching PStates higher, even if the monitors indicate a low latency condition.

In some implementations, hysteresis is provided between transitions of PStates to prevent too rapid of PState transitions. For example, in some implementations programmable hysteresis thresholds are used to provide up and down hysteresis. For up hysteresis, a single observation over a programmable threshold (e.g., over a threshold of 50% of current DPM state bandwidth) is used, however any suitable threshold can be employed. For down hysteresis, multiple consecutive observations below the threshold of the next lower PState is used to prevent dithering. However, any suitable thresholds and hysteresis mechanisms may be employed.

For multiple socket implementations, where each IC includes its own data fabric, FCLK requirements are evaluated independently and can result in different FCLKs on the two sockets. In some examples, a desired ratio is maintained between fabric frequency and socket to socket interconnect frequency.

Figure 9:
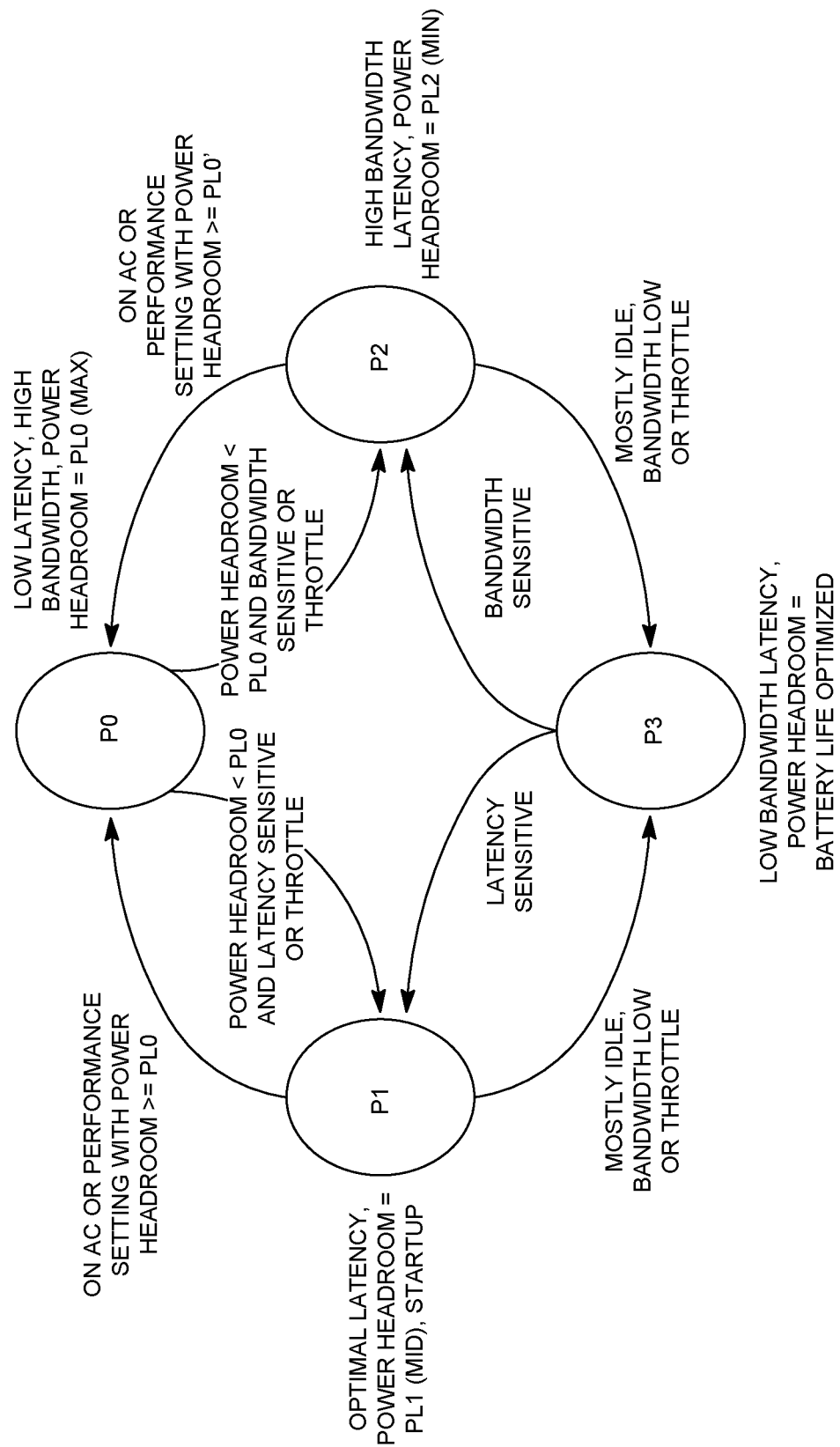
FIG. 9 is a state diagram illustrating memory performance state changes in accordance with one example set forth in the disclosure.

FIG. 9 is a state diagram illustrating memory performance state switching sequences. The memory performance states P0-Pn are the performance states of the memory data fabric and other uncore units used to access memory. P0 being the highest performance state and Pn the lowest. PL represents the power thresholds mapped to the respective states. When on an AC power setting or high-performance setting, uncore performance is maximized and when on a battery DC setting or energy efficiency setting, performance/watt of the fabric is maximized. SMU tracks the power consumed by the different non-compute units based on the power monitors and leakage vs temp curves. The state diagram is based on the performance state table shown in FIG. 7.

Figure 10:
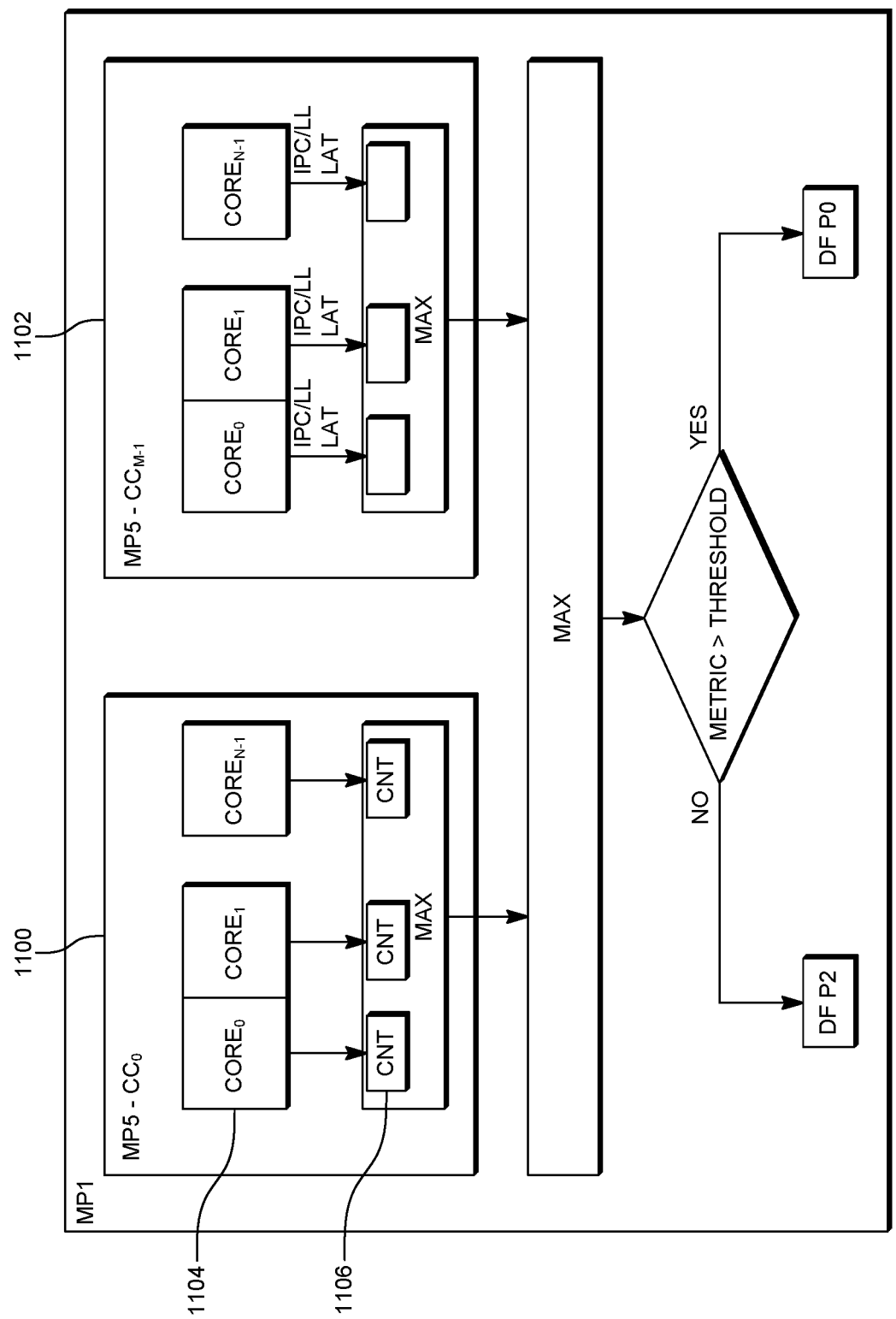
FIG. 10 is a flow diagram illustrating a method for providing power management in accordance with one example set forth in the disclosure.
Figure 11:
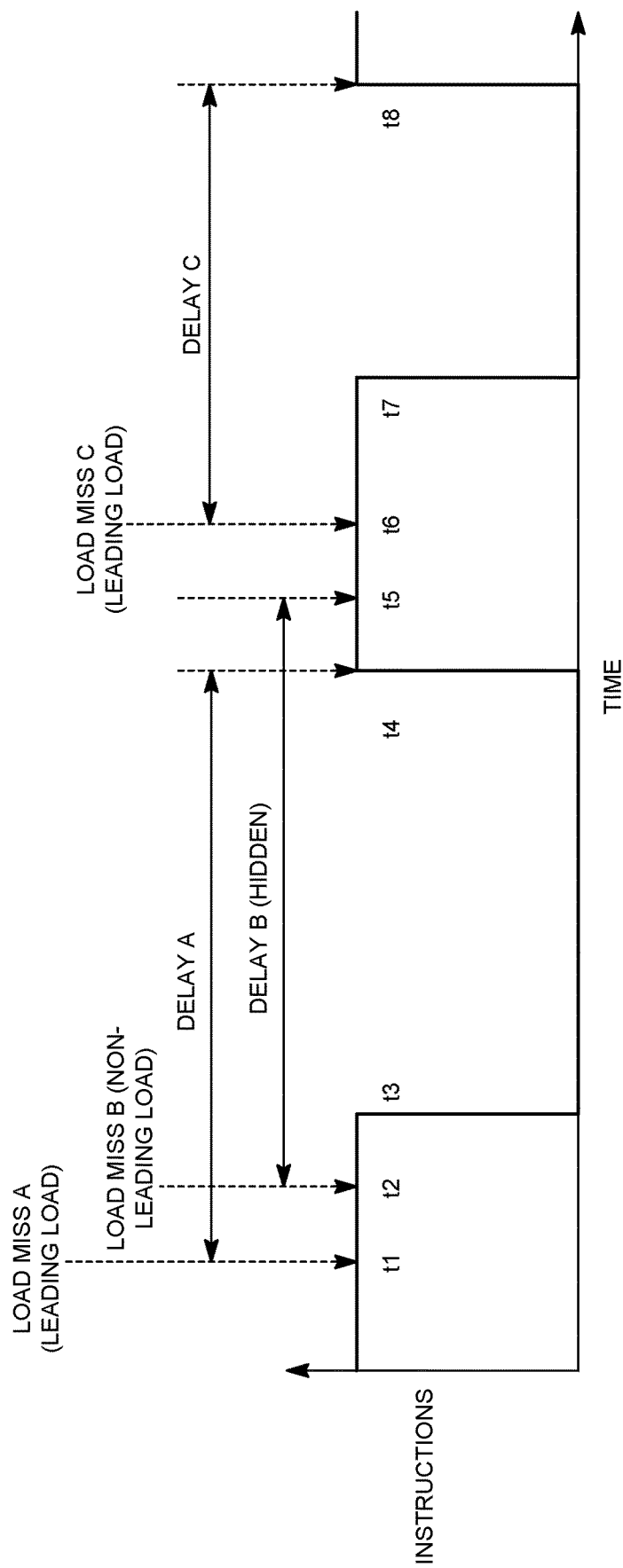
FIG. 11 is a timing diagram illustrating latency delays that are detected in accordance with one example set forth in the disclosure.

FIG. 10 illustrates an integrated circuit that employs multiple core groups 1100 and 1102, each core 1104 has a memory latency counter 1106. The PML in some implementations aggregates latency measurements for groups of cores. In certain implementations, the memory latency counters are aggregated since one SOC has multiple core groups (CCDs) 1100 and 1102. The power management logic reads them and calculates an intermediate latency metric per group as shown in Equation 1. After that, the PML finds the maximum value among all the cores within that group. Next, the PML calculates the maximum value among all CCDs. After that, the PML multiplies the result by the memory busy as described in Equation 2. Finally, the value is compared against a threshold and selects the non-compute unit memory PState. In FIG. 11 MP5 represents the power management unit of a group of cores and MP1 represents the SoC power management unit. In some implementations, the methodology is also applied for socket to socket latency where aggregated latency counters for each SoC are compared and if an SoC needs a higher power PState to compensate for latency, the memory PState is selected that provides the higher fabric frequency to improve socket to socket latency.

As shown, the maximum is taken because voltage scaling of SoC frequency can flatten out beyond a particular FCLK. Hence the amount of power and performance cores can gain for compute bound scenarios by running at a lower PState is small. Whereas the amount of performance a core can lose by not running at a higher PState is large for memory latency (and memory bandwidth) sensitive workloads. In another embodiment, instead of the maximum of all cores, the aggregated latency metric can be calculated as a weighted sum of the distances of each core's latency metric from the threshold t across all active cores. If the weighted aggregated latency metric is still positive, the P0 state is taken as the global system level optimum. If the weighted metric is negative, a lower PState is selected as the global system level optimum. This is shown in the following equation for Alternate final latency metric.

$$ms = \sum (mc_i - t)$$
$$Pstate = \begin{cases} 0 \text{ if } ms \geq 0 \\ 2 \text{ if } ms < 0 \end{cases}$$

Alternate final latency metric

In certain implementations, a metric to infer memory latency workloads is used. The memory latency metric is used to identify when a workload is memory latency sensitive (such as one that is being executed by a CPU complex). In this case, the SoC needs to transition to a higher PState to deliver the best performance. The metric is based on three events: Micro-instructions per cycle, average latency of sampled leading load hits in DRAM or IO as seen by a load store unit, and the memory busy signal.

The calculation is done in two steps: 1) read the core counters and derive an intermediate latency metric; 2) aggregate the intermediate metric (by calculating the max) for each core and multiply the result by the memory busy signal. The following equations provides a formal definition of the metric.

First calculate the intermediary metric, mci per core, i, where IPCi is the micro-instructions per cycle, CoreMem- Lati is the average latency of sampled leading load hits in DRAM or IO as seen by load store unit $$mc_i = \left(\frac{IPC_i}{CoreMemLat_i}\right)$$ Equation 1: Intermediate latency metric Next, aggregate the mc for all cores in the socket and decide the SoC P-state of the socket based on the ms value:

$$ms = \max(mc_0, mc_1, \ldots, mc_{n-1}) \cdot \text{MemBusy}$$

Equation 2: Final latency metric

The rationality behind multiplying by the memory busy signal is that workloads that have infrequent memory access may experience high latency for a single access, but these infrequent accesses do not add a significant penalty to the workload. As such, the memory busy signal is used to qualify the latency metric and amortize this effect. When both metrics are coupled, the metric tries to capture workloads that are not memory bandwidth sensitive and not latency sensitive in one extreme, these should be run at lower a PState. Everything else needs to run at higher lower PState. A threshold is used to separate the space.

$$Pstate = \begin{cases} 0 & \text{if } ms \geq t \\ 2 & \text{if } ms < t \end{cases}$$ Equation 3: Deciding DF – PState Equation 3: Deciding PState Referring to FIG. 11, as to detecting memory latency, leading load latency can be defined as the latency of the first load that is missed in the cache/DRAM memory. See FIG. 12 illustrates an example of a leading load. After the first load miss (Load miss A), any consecutive load misses are not considered as a leading load (Load miss B), as the delay due to those misses are hidden by the leading load. Only after the first leading load is returned, the very next load is going to be considered as the leading load (Load miss C).

Among various technical solutions, in some implementations, the structure and operation distinguish states and application specific requirement for latency and/or bandwidth. In some examples, only if the use case is latency sensitive, then specific fabric frequency is raised but for bandwidth centric scenarios the frequency is maintained at the minimum level enough to deliver maximum bandwidth through the parallel interfaces to the data fabric. In certain implementations, the power management logic looks at latency requirements of coherent traffic between multiple sockets in a server system to determine fabric frequency. This allows scaling from socket-to-socket because it takes into account data traffic across the coherent fabric between sockets when applied to a multi-integrated circuit (e.g., die or chip) configuration. In some implementations, the power management system determines among different heterogenous types of workloads and adjusts the power consumption of non-compute units based on a type of heterogenous workload, such as by which compute unit has a detected bandwidth requirement above a threshold. The adjustment of the power consumption is done through adjusting from one performance state to another. Each performance state changes a frequency and/or voltage for a non-compute unit. One advantage is that the system leaves more power budget available for the compute units. The heterogenous types of workloads are those being handled by the heterogeneous compute units.

In some examples, determining the different heterogenous types of workloads is done using, for example, predictive operating system hints, driver hints, and/or activity monitors that monitor compute memory access traffic for each of the compute units or memory access engines during runtime. The compute unit can include a video codec, GPU core, CPU core, display engine, or other engine or unit that accesses memory.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing power management for one or more integrated circuits (ICs) comprising:
   detecting, by one or more bandwidth detectors, a memory bandwidth level associated with a respective workload running on each of a plurality of heterogeneous compute units on the one or more ICs;
   in response to the detected memory bandwidth level, adjusting a power level of at least one non-compute unit on at least one of the one or more ICs from a first power level to a second power level, the at least one non-compute unit comprising a data fabric that transfers data among the plurality of heterogeneous compute units and memory, wherein the adjusting the power level comprises selecting a memory performance state that provides a maximum level memory data transfer rate, with a reduced frequency clock of the data fabric and voltage level of the data fabric compared to another memory performance state that provides a same maximum level memory data transfer rate with a higher data fabric clock frequency setting and higher voltage level; and executing at least one workload using the adjusted power level.

2. The method of claim 1 wherein detecting the memory bandwidth level comprises monitoring memory access traffic associated with each of the plurality of heterogeneous compute units on the one or more ICs and wherein the at least one non-compute unit is used to access memory used by the plurality of heterogeneous compute units.

3. The method of claim 1 wherein adjusting the power level comprises accessing a memory performance state table comprising:
- a plurality of memory performance states wherein each state includes data representing an allowable memory data transfer speed for the memory performance state, a non-compute unit voltage setting, a data fabric clock frequency setting and a memory clock frequency setting, and
- wherein at least a first performance state and a second performance state include the same maximum level memory data transfer rate, the first performance state having a lower data fabric frequency setting and lower non-compute unit voltage setting than the second performance state.

4. An integrated circuit (IC) comprising:
- a plurality of heterogeneous compute units;
- a plurality of non-compute units operatively coupled to the plurality of heterogeneous compute units:
- power management logic operative to:
  - detect a memory bandwidth level associated with a respective workload running on each of a plurality of heterogeneous compute units on the IC;
  - in response to the detected memory bandwidth level, adjust a power level of at least one non-compute unit on the IC from a first power level to a second power level, the at least one non-compute unit comprising a data fabric that transfers data among the plurality of heterogeneous compute units and memory, wherein the adjusting the power level comprises selecting a memory performance state that provides a maximum level memory data transfer rate, with a reduced frequency clock of the data fabric and voltage level of the data fabric compared to another memory performance state that provides a same maximum level memory data transfer rate with a higher data fabric clock frequency setting and higher voltage level; and
  - execute at least one workload using the adjusted power level.

5. The IC of claim 4 wherein the power management logic comprises one or more bandwidth detectors that is operative to:
- detect the memory bandwidth level by at least monitoring memory access traffic associated with each of the plurality of heterogeneous compute units on the IC; and wherein the at least one non-compute unit is used to access memory used by the plurality of heterogeneous compute units.

6. The IC of claim 4 wherein the power management logic is operative to adjust the power level by accessing a memory performance state table comprising:
- a plurality of memory performance states wherein each state includes data representing an allowable memory data transfer speed for the memory performance state, a non-compute unit voltage setting, a data fabric clock frequency setting and a memory clock frequency setting, and
- wherein at least a first performance state and a second performance state include the same maximum level memory data transfer rate, the first performance state having a lower data fabric frequency setting and lower non-compute unit voltage setting than the second performance state.

7. An integrated circuit (IC) comprising:
- a plurality of compute units;
- a plurality of non-compute units operatively coupled to the plurality of compute units:
- a data fabric configured to communicate data with at least another integrated circuit; and
- power management logic operative to:
  - detect memory access latency associated with a workload running on at least one of the plurality of compute units and detect memory access latency associated with a compute unit on the at least another IC;
  - change a memory performance state associated with at least one of the plurality of non-compute units based on the detected memory access latency associated with the another integrated circuit;
  - in response to a workload requiring additional memory bandwidth, select a memory performance state that provides a maximum level memory data transfer, with a reduced frequency clock of the data fabric and voltage level compared to another memory performance state that provides a same maximum level memory data transfer rate with a higher data fabric clock frequency setting and higher voltage level; and
  - execute at least one workload using a respective changed memory performance state or selected memory performance state.

8. The IC of claim 7 wherein the power management logic comprises one or more bandwidth detectors that is operative to monitor memory access traffic associated with each of the plurality of compute units on the integrated circuit and wherein the power management logic is operative to select a memory performance state associated with at least one of the plurality of non-compute units, based on both the detected memory access latency and the monitored memory access traffic.

9. The IC of claim 7 wherein the plurality of non-computes units comprises:
- a data fabric, operatively coupled to the plurality of compute units, and
- memory control logic, operatively coupled to the compute units through the data fabric, and wherein the power management logic is operative to select a memory performance state associated with at least one of the plurality of non-compute units, by arbitrating among data representing a detected latency level associated with a central processing core compute unit and a data representing a memory bandwidth level associated with a graphics processing core compute unit.

10. The IC of claim 7 wherein the power management logic comprises:
   memory latency monitor logic operative to detect memory access latency associated with memory load requests issued by a central processing compute unit during runtime; and
   memory bandwidth monitoring logic operative to detect memory bandwidth levels associated with other of the plurality of compute units.

11. The IC of claim 9 wherein the power management logic comprises cross integrated circuit memory bandwidth monitor logic configured to detect memory bandwidth associated with compute units on the another integrated circuit and wherein the power management logic is operative to increase a memory performance state to a highest power state including increasing a data fabric clock frequency to a highest performance state level based on the detected memory bandwidth level from the another integrated circuit.

12. The IC of claim 7 wherein the power management logic is operative to prioritize latency improvement for at least one compute unit over bandwidth improvement for at least another compute unit.

13. The IC of claim 7 wherein the power management logic comprises:
   memory latency detection logic, operative to detect memory latency for a workload associated with at least a first compute unit and provide a first memory performance state based on the detected memory latency;
   memory bandwidth detection logic, operative to detect a memory bandwidth level used by at least a second compute unit and provide a second memory performance state based on the detected memory bandwidth level; and
   arbitration logic operative to select a final memory performance state based on the first and the second memory performance states and based on available power headroom data.

14. The IC of claim 7 wherein the plurality of compute units comprise a plurality of heterogenous compute units and the power management logic is operative to:
   detect a memory bandwidth level associated with a respective workload running on each of a plurality of heterogeneous compute units on the IC; and
   adjust a power level of at least one non-compute unit on the IC from a first power level to a second power level, based on the detected memory bandwidth levels.

15. The IC of claim 14 wherein the power management logic is operative to:
   detect the memory bandwidth level by at least monitoring memory access traffic associated with each of the plurality of heterogeneous compute units on the IC; and
   wherein the at least one non-compute unit is used to access memory used by the plurality of heterogeneous compute units.

16. An apparatus comprising:
   a memory system comprising a plurality of memory non-compute units and memory;
   a plurality of heterogeneous compute units operatively coupled to the memory system;
   a data fabric operatively coupled to the plurality of heterogeneous compute units;
   memory interface logic, operatively coupled to the data fabric and to the memory of the memory system; and
   power management logic operative to:
      detect memory access latency associated with a respective workload running on each of the plurality of heterogeneous compute units;
      detect a memory bandwidth level associated with a respective workload running on each of the plurality of heterogeneous compute units;
      change a memory performance state associated with at least one of the plurality of non-compute units based on the detected memory access latency and based on the detected memory bandwidth levels, by controlling an operational state of the data fabric to:
         in response to a bandwidth level increase being needed for at least one of the heterogeneous compute units, selecting a memory performance state that provides a maximum level memory data transfer rate with a reduced frequency clock of the data fabric and voltage level compared to another memory performance state that provides a same maximum level memory data transfer rate with a higher data fabric clock frequency setting and higher voltage level; and
      execute at least one workload using the selected memory performance state.

17. The apparatus of claim 16 wherein the power management logic is further operative to change the memory performance state by controlling an operational state of the data fabric to:
   in response to a memory latency sensitive workload being performed by at least one of the plurality of compute units, increase a clock frequency of the data fabric to provide a maximum level memory data transfer rate for the memory.

18. The apparatus of claim 16 wherein the power management logic comprises:
   memory latency detection logic, operative to detect memory latency for a workload associated with at least a first heterogeneous compute unit and provide a first memory performance state based on the detected memory latency;
   bandwidth detection logic, operative to detect memory bandwidth level used by at least a second heterogeneous compute unit and provide a second memory performance state based on the detected memory bandwidth level; and
   arbitration logic operative to select a final memory performance state based on the first and second memory performance states and based on available power headroom data.

19. The apparatus of claim 16 wherein the power management logic is operative to prioritize latency improvement for at least one heterogeneous compute unit over bandwidth improvement for at least another heterogeneous compute unit.

20. The apparatus of claim 16 comprising a socket operatively coupled to the data fabric and operably coupled to some of the plurality of heterogeneous compute units that are on a first integrated circuit and with a heterogeneous compute unit on a second integrated circuit and wherein the power management logic is operative to detect memory access latency associated with the heterogeneous compute unit using the socket and operative to change a memory performance state associated with the plurality of non-compute units on the first integrated circuit based on the detected memory access latency associated with the heterogeneous compute unit on the second integrated circuit.

21. The apparatus of claim 16 comprising wherein the power management logic is operative to adjust the power level by accessing a memory performance state table comprising:

a plurality of memory performance states wherein each state includes data representing an allowable memory data transfer speed for the performance state, a memory non-compute unit voltage setting, a data fabric clock frequency setting and a memory clock frequency setting, and wherein at least a first performance state and a second performance state include a same maximum level memory data transfer rate, the first performance state having a lower data fabric frequency setting and lower memory non-compute unit voltage setting than the second performance state.

\* \* \* \* \*